3,247,014
METHOD OF COATING SOLID PARTICLES
William M. Goldberger, Columbus, Ohio, and Charles J. Baroch, San Jose, Calif., assignors, by mesne assignments, to The Battelle Development Corporation, Columbus, Ohio, a corporation of Delaware
Filed May 29, 1963, Ser. No. 284,247
16 Claims. (Cl. 117—100)

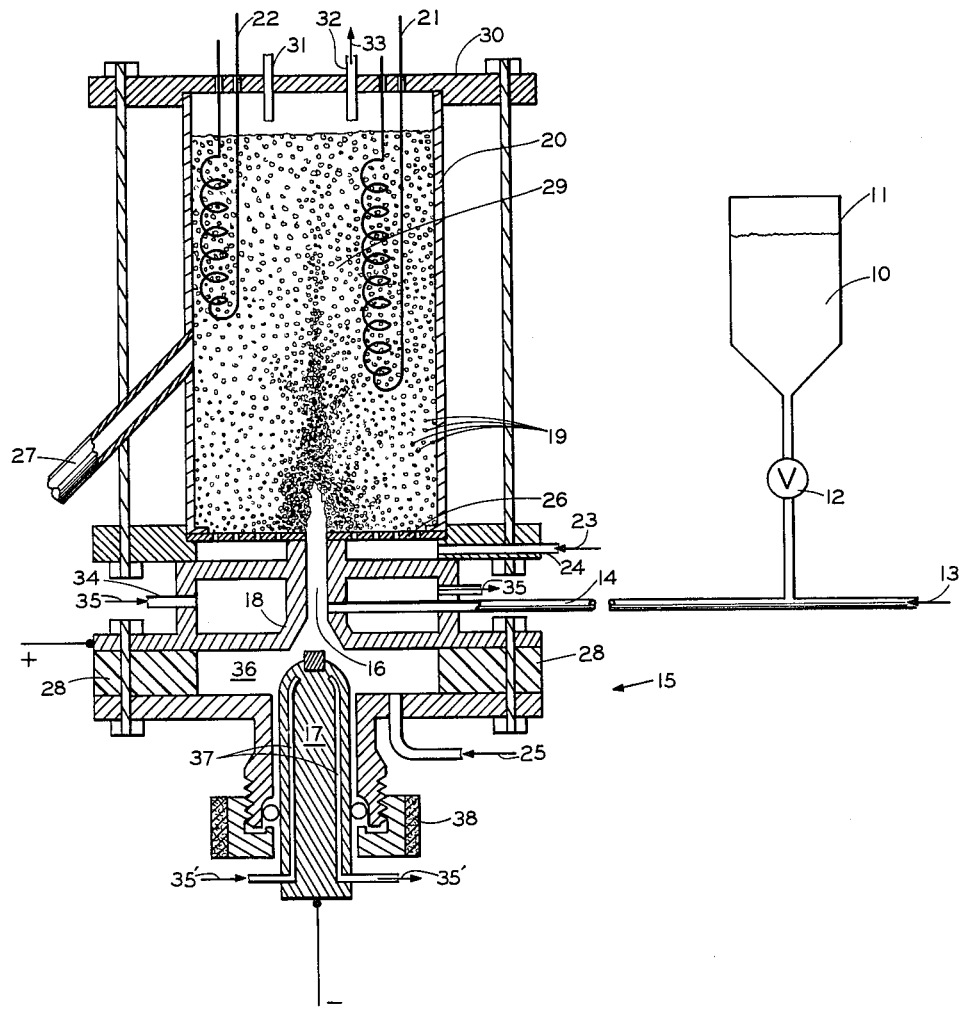

This invention relates to a method of coating solid particles. In particular, this invention relates to a method of coating solid particles by first vaporizing the coating substance in a body of hot moving gas in the plasma state, then condensing the vaporized coating material on to the surface of the solid particles while they are in a fluidized bed.

Many uses exist for solid particles that are coated with another solid substance. Fine particles of silica have been coated with various chemically active inorganic materials. Inorganic coatings on silica have been used in paint pigments. Materials for fabricating parts by powder metallurgy techniques can be made of coated materials.

There are several applications of coated powders in which it is desirable to have the particles coated with a very high melting point material. For example, the coatings on nuclear fuel particles should be able to withstand extremely high temperatures. The coating for this application should be dense, nonporous, and chemically inactive in an oxidizing atmosphere. Various high melting point coating metals have been applied as well as nonmetallic coatings.

In this invention, the method used for applying the desired coatings of high melting point materials generally involves a deposition of the coating substance from a gas that is in direct contact with the particles to be coated. One particular method involves the vaporization of the coating material, followed by the condensation and deposition of that coating material directly on the surface of the particles to be coated. Another method of coating involves a chemical reaction at the surface of the particle to be coated. For example, if aluminum chloride is hydrolyzed with water vapor in the presence of an inert solid, there will be developed an aluminum oxide coating on the surface of the inert solid by the reaction:

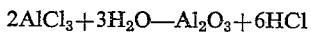

During the coating process it is advantageous to promote good contact between the gases and solid particles. Maintaining the particles in a fluidized condition accomplishes this desired contact. That is, when fluidized, the particles are suspended in the gases and vapors containing the coating substance. The fluidized bed method provides excellent control of the particle temperature and is a convenient way to obtain a uniform coating from one particle to another.

In practice, it is generally true that denser and less porous coatings are obtained when the coating is applied at a temperature near the melting point of the coating substance. In many cases it is both technically and economically advantageous to obtain coatings that are formed by condensing a vapor of the coating substance rather than by conducting a surface chemical reaction. For example, an alumina coating obtained from alumina vapor has different characteristics than the alumina coating obtained by the hydrolysis reaction noted above. The coating from alumina vapor can be denser and less porous. Furthermore, alumina is easier and cheaper to use directly as a raw material than aluminum chloride.

It is acknowledged that a fluidized bed, per se, is not new nor is a plasma generating device (electrothermal torch apparatus), per se, new. However, coating particulate solids with substances whose melting points are in excess of 1500° C. by combining and using these two art media as a single integrated processing unit constitutes a novel process not known in the prior art.

In the prior art of coating when a fluidized bed was used without the complementary assistance of a plasma generator, it was not possible to generate coatings on solid particles at temperatures near the melting point of the coating substance when very high melting point material, such as alumina, was used. Nor was it possible to obtain coating of fluidized solid particles by simple condensation of the coating substance from its vapor when coating with substances having a very high boiling point. Maximum temperature of the prior art fluidized bed coating procedure was about 1500° C., which is far too low to successfully accomplish vapor deposition of such low volatility substances as carbon, alumina, beryllium, and the refractory metals. Furthermore, by the prior art method of coating by surface chemical reaction in a fluidized bed, the particle surface temperature could not be maintained near the melting point of these high melting point materials.

It is an object of this invention to coat particulate solids with high melting point substances in a fluidized bed by vapor deposition at particle surface temperatures near the melting point of the coating substance.

It is another object of this invention to coat particulate solids with high melting point substances in a fluidized bed by vapor deposition at particle surface temperatures near the melting point of the particulate solids in the fluidized bed.

It is still another object of this invention to coat particulate solids with high melting point substances in a fluidized bed by depositing and solidifying molten high melting point substances on the particles at particle surface temperatures near the melting point of the coating substance.

It is still another object of this invention to coat particulate solids with high melting point substances in a fluidized bed by depositing and solidifying molten high melting point substances on the particles at particle surface temperatures near the melting point of the fluidized bed particles.

It is a further object of this invention to apply coatings onto particulate solids in a fluidized bed by conducting surface chemical reactions at the particle surface at surface temperatures near the melting point of the coating substance.

Other objects and advantages of this invention will become apparent from the following description, examples, and explanations thereof, including the drawing wherein the single figure is an embodiment of an integrated processing unit of this invention comprising a plasma jet generator coupled to a fluidized bed and operable as a single integrated processing unit for the process of this invention.

In general, the present invention comprises a method of coating particles with high melting point material, said method comprising the steps of:
(a) Introducing the coating material into a plasma jet flame, (b) Introducing the plasma jet flame containing the coating material into a bed of fluidized particles, (c) Controlling the electrical energy input to the plasma, (d) Controlling the temperature in the fluidized bed, (e) Controlling the rate of flow of the coating substance into the plasma, (f) Controlling the rate of flow of the plasma-formed gas, (g) Controlling the rate of removal of the coated particles.

In this invention the reactants (solids, liquids of low volatility or gases) which includes the coating material are introduced into a body of moving hot gas in a plasma state where the reactants may partially melt, completely melt, vaporize, sublime or combinations thereof. The temperature of the hot plasma and reactant (solids, liquids, or gases) entering the fluidized bed are controlled by the electrical energy input to the plasma and by the rate of flow of the plasma forming gas. The reactants (solids, liquids, or gases) in the plasma stream are directed into a fluidized bed of particulate solids. These solids are fluidized and maintained partially at a temperautre substantially lower than the introduced plasma and reactants. An auxiliary fluidizing gas substantially cooler than the introduced plasma and reactant (solids, liquids, or gases) may be made to flow upwardly through the particulate solids to control the degree of fluidization. In the fluidized bed, the plasma with the reactants is quenched rapidly with continuous cooling rates as high as about $50 \times 10^{6\circ}$ K. per second. During this cooling process, some of the reactants condense or solidify and collect on the surface of the particulate solids of the fluidized bed or react with the particulate solids. Other reactants solids, liquids, or gases) may pass through the fluidized bed of particulate solids and condense or solidify and collect outside of the fluidized bed. The desired end product of the subject process may be the coated particulate solids or, if a chemical reaction occurs with the particulate solids, the desired end product may be the product of a chemical reaction of the reactants (solids, liquids, or gases) and particulate solids or it may be the residual reactants passing through the fluidized bed which may condense or solidify and collect or react elsewhere than in the fluidized bed.

The illustrative drawing is an illustration of a device capable of coating substances as in this invention. In it powdered solid coating substance 10 is fed from storage vessel 11 through metering valve 12. A stream of gas 13 entrains solids 10 and carries them through feed tube 14 into plasma generator 15. The solids 10 are thereby introduced into a plasma jet flame 16 that is generated between electrodes 17 (movable) and 18 (fixed) of the plasma generator 15. The temperature of the plasma jet is sufficient to cause solids 10 to melt and become fine liquid droplets entrained in plasma gas 16. At sufficiently high temperature and energy levels in the plasma, solids 10 can be virtually completely vaporized. The components of the plasma are then injected directly upward into the bottom of a bed of fluidized particles 19 which are contained in fluidization vessel 20. The coating substance thus vaporized and contained in the plasma contacts the surface of fluidized bed particles 19, condenses thereon and causes them to be coated. The fine liquid droplets of the coating substance 10, upon contact with particles in the fluidized bed, adhere to them and thus coat their surface with a thin molten film of the coating substance, which then solidifies to form the solid coating.

The temperature of the majority of the particles 19 in the fluidized bed 20 can be maintained at a desired level by operating the bed in a nonadiabatic manner. Heat can be added by elements 21 to raise the bed temperature. Heat can be removed from the bed through cooling coils 22, if desired. A secondary gas stream 23 may be provided through pipe 24 and distributor plate 26 to control the degree of fluidization.

According to the method of this invention, the particulate solid material 19 to be coated is placed or fed into fluidization vessel 20. The material is fluidized with a suitable gas 25 which flows at a suitable rate through the free space between electrodes 17 and 18 before entering the fluidized bed 20. Secondary fluidizing gas 23 can be used if desired to maintain a more uniform degree of fluidization at the bottom of the fluidization vessel 10.

A D.C. voltage is imposed on the electrodes over which a high-frequency A.C. field is superimposed which causes ionization and allows an arc to be generated between the electrodes and through the plasma-forming gas. Once an arc is initiated and steady D.C. current flow is established, the high-frequency field is no longer needed. The D.C. discharge causes an electrothermal converison of energy to heat the gas 25 between the electrodes 17 and 18 to an energy level sufficient to cause significant ionization of the plasma gas to occur. The ionized gas, called a plasma, issues from the plasma generator as a confined arc or jet 16. Temperatures in the plasma 16 vary. They generally are in excess of 10,000° K., depending on the particular plasma-forming gas 25 that is used and the electrical energy input. After the plasma 16 is formed, the coating substance 10 is introduced through tube 14 into the plasma jet. The extreme temperatures of the plasma 16 cause the coating substance 10 to become molten. The plasma gases containing the coating substances come into direct contact with particles 19 in the fluidized bed 20. The contact results in solidification and coating of particles in the fluidized bed. The extent of the coating depends upon the mass flow of the coating substance, the amount of particles in the fluidized bed, the bed temperature, and the duration of the operation. Particles from the bed may be withdrawn in a continuous manner or intermittently through pipe 27.

It is important to recognize that the majority of the particles in the fluidized bed can be maintained at a temperature much lower than the melting point of the coating substance, by controlling the rate of heating or cooling of the bed with elements 21 and 22. A portion of the particles in the fluidized bed 20 comes directly into contact with the plasma flame and the temperature of the particles can greatly exceed the bulk bed temperature. By the method of this invention, some particles of the fluidized bed are being continually entrained by the plasma jet and sufficient energy is transferred to these entrained particles to raise their surface temperature to the melting point of the particulate solids. In fact, the surface temperature of these solids can reach the melting temperature of the coating substance as it deposits thereon. The deposition of the coating substance onto the surfaces that are molten causes an extremely adherent bond between the coating material and the substrate. Such coatings have the desirable properties of high density and low porosity.

A fluidized bed chamber 29 is provided with a top plate 30 which has a conduit 31 for entry of fluidizable solids 19 and an exit port 32 for effluent gases 33 escaping from the fluidized bed chamber 29.

The plasma jet generator (electrothermal torch apparatus) is coupled directly beneath the fluidized bed unit 20 so as to make a single integrated processing unit. The plasma jet generator 15 has a fixed electrode (anode) 18 which has a hollow cooling chamber passage 34 throughout to permit flow through of coolant 35. Directly below the fixed electrode 18 is a chamber 36 for entry of the plasma-forming gas 25 into the arc between the fixed electrode 18 and the movable electrode 17 when the integrated unit is in operation. Core chamber 37 is provided for coolant 35' to cool the movable electrode 17. The movable electrode 17 is completely electrically insulated from the fixed electrode 18 by conventional electrical insulating means 28. A packing means 38 for the movable electrode 17 prevents leakage of gases.

The single integrated processing unit comprising the plasma generator coupled to the fluidized bed may be constructed in a manner other than the fluidized bed being coupled directly over the plasma generator. The plasma generator may be coupled to the fluidized bed with the fluidized bed directly beneath the plasma generator. Such an arrangement may be more desirable when the plasma jet stream is spraying coating materials downward into the fluidized particles rising to meet the plasma jet stream. Other coupling arrangements between the plasma generator and the fluidized bed may be employed when it is advantageous to the particular chemical process undertaken.

The entrainment of individual bed particles by the plasma jet and the transfer of energy from the plasma to the entrained particles can be sufficient to melt the particles and cause them to become individual fused masses rather than remain as individual porous particles. Thus, the process of this invention may be used for fusing or partially fusing porous particles. In the case where fusion is the principal objective, it is unnecessary to employ the coating substance.

The transfer of energy from the plasma to particles from the bed that have been entrained in the plasma may be sufficient to cause the bed particles to vaporize to some extent. The vapors caused by this mechanism will then condense on the surface of particles within the fluidized bed that are at a temperature lower than the condensation temperature of the vapors. Thus, particles in the fluidized bed may be coated without necessarily feeding a coating substance into the plasma flame before the plasma flame is introduced into the fluidized bed. In one application of this method of coating, two different types of solid particles may be charged to the fluidized bed. The more volatile solid then will be preferentially coated upon the less volatile.

It is apparent that, in the operation of the process of this invention, energy is transferred from the plasma to the solids entrained in the plasma. This condition can result in a rise in the temperature of the solids in the fluidized bed. The bulk bed temperature, however, can be controlled by removing heat from the fluidized bed. This can be accomplished in a variety of ways, such as by immersion of cooling coils within the bed, by transferring of heat outward through the walls of the fluidized bed vessel, and by removing a part of the solids contained in the fluidized bed, then cooling them in a separate cooling chamber, and returning the cooled solids to the bed. This latter procedure can be done continuously if desired.

It has been found that the transfer of energy from the plasma to the solids can be extremely rapid. This transfer can result in cooling of the plasma corresponding to cooling rates as high as 50 million degrees K./sec. The lack of a facility for rapid cooling or quenching of the plasma flame and its products has been one major difficulty encountered in the commercial development of plasma chemical processes.

During the operation of this invention, it may happen that chemical reactions occur between the components of the plasma. In such cases, rapid cooling, as possible by this process, is significant where it is desirable to "freeze" the chemical process equilibrium and thus prevent reverse reactions or changes upon cooling of the products of the plasma chemical processes.

For example, if methane ($CH_4$) is passed through a hydrogen plasma, the $CH_4$ will dissociate and form acetylene ($C_2H_2$) at the very elevated temperature of the hydrogen plasma gas. However, if the $C_2H_2$ is permitted to cool at a normal rate, the $C_2H_2$ will polymerize and form a spectrum of hydrocarbon compounds. However, if the $C_2H_2$ in the hot hydrogen plasma is cooled in a fluidized bed at the ultrahigh rates of heat exchange possible in a fluidized bed, then the $C_2H_2$ reverse and side reactions are minimized and effective "freezing" of the $C_2H_2$ compound is attainable with a minimum of loss.

Another area where ultrahigh heat exchange properties are desirable is in the carbothermic reduction of metal oxides at elevated temperatures. If permitted to cool slowly the very hot metal will combine with the carbon monoxide and revert back to an oxide or carbide or both. However, if the ultrahigh quenching rates of a fluidized bed are used on the metal, the very rapid heat removal from the oxide-free metal will defeat the mechanics of reverse kinetics and will "freeze" the metal in an oxide- and carbide-free state.

Chemical reactions between the plasma components, components in the auxiliary gas, and the components in the solids of the fluidized bed may also occur during the operation of this invention.

Reactive components may be introduced into the system in the auxiliary fluidizing gas and thereby made to react with components in the plasma or components contained in the fluidized bed particles. For example, carbothermic reduction of high melting point metal oxides may be performed by first introducing the solid oxides with solid carbon into the fluidized bed. During the course of entrainment and passage of both of these particles in the plasma jet stream within the bed, they may be sufficiently thermally activated to allow interaction and reduction of the oxide with liberation of carbon monoxide.

Methane, when introduced in the auxiliary fluidizing gas, can be made to dissociate or "crack" when it comes into contact with the plasma jet flame, thus forming acetylene and other components.

Hydrogenation can also be conducted by the process of this invention by first cracking methane as described above or by introducing other hydrogen-containing components in either the auxiliary gas or the plasma-forming gas and having said hydrogen-containing agents contact solid carbon or carbon-containing solids that were introduced into the fluidized bed.

The effective application of the process of this invention is clearly illustrated in the following examples.

*Example 1*

This example illustrates the coating of solid particles by a plasma spray in a fluidized bed. The equipment used to perform the coating was similar to that illustrated in the drawing. Alumina was coated on copper particles in a fluidized bed. The copper particles fluidized were about 100 microns in size before being coated with alumina which entered the fluidized bed in the plasma jet stream from the plasma generator. The alumina powder, −270 mesh, was charged into the plasma stream at a rate of 5–10 grams per hour using argon gas as a carrier which was flowing at a rate of 0.04 standard cubic feet per minute (s.c.f.m.). The rate of flow of argon, the plasma-forming gas, was 0.18 s.c.f.m. Argon was used for both the reactant carrier and the principal plasma gas. The arc was maintained at a voltage of 16 volts and a current of 182 amperes. The coolant fluid, water, flowing through the anode was 1500 cc. per minute and 1750 cc. per minute through the cathode, movable electrode. The gas flow from the plasma jet stream was sufficient to fluidize the copper particles. The bulk bed temperature of the fluidized copper particles in this example was about 200° C. However, individual particles did attain a considerably higher temperature when in direct contact with the plasma. The pressure in the fluidized bed was one atmosphere. At the end of the plasma-fluidizing operation, the copper particles were carefully examined. Examination revealed that the copper particles were coated with a film of alumina.

*Example 2*

This example illustrates a plant-size operation for manufacturing 150 tons of calcium carbide ($CaC_2$) per day which employs an integrated processing unit comprised of a fluidized bed coupled to a plasma generator as in this invention. The fluidized bed, 10 feet in diameter and at one atmosphere of pressure, is coupled to a 13,000 kw. plasma generator. A very fine powdered mixture of carbon (57 tons per day) and lime of 98.9 percent calcium oxide (130 tons per day) are carried to the plasma generator by carbon monoxide (CO) and charged into the plasma jet stream of CO plasma (83.2 tons per day). The CO plasma gas passes between the arcing electrodes at 1600 s.c.f.m. The electrical energy input of the CO at the plasma generator is sufficient to provide the necessary heat to liquefy the lime to small droplets and also to provide the heat for the subsequent carbide reaction. The lime droplets and the coke particles entrained in the CO plasma jet are sprayed into the fluidization vessel which is directly above the plasma arc generator. The solids contained in the fluidized state in the fluidization vessel consist essentially of calcium carbide pellets with a thin liquid film on the surface which comprises a mixture of calcium carbide, lime, and the solid coke. The temperature in the fluidized bed is approximately 1800–1900° C. Higher surface temperatures will occur in the immediate region where the plasma is introduced into the fluidized bed. The lime-carbon reaction to form calcium carbide then occurs on the surface of the bed particles in the thin liquid film. Suitable control of the particle size within the fluidized bed and the gas velocity prevent bed particles from sticking to each other. The fluidized bed, therefore, operates in a "self-agglomerating" manner to retain the incoming feed material.

Carbide particles are continuously drawn from the fluidized vessel to have their sensible heat transferred to the unheated plasma gas and they are then packed for shipping without further operation.

*Example 3*

This example illustrates a plant-size operation for producing 1 ton per hour of elemental phosphorus employing the plasma generator-fluidized bed integrated unit as the principal processing unit in the process of producing the elemental phosphorus as by this invention. A fluidized bed 10 to 14 feet in diameter is coupled to an 8,000 kw. plasma generator. In the process, finely ground solids containing the phosphatic material (7.6 tons/hour containing 35% $P_2O_5$), the silica flux (2 tons/hour), and carbon (1.4 tons/hour) are fed into a carbon monoxide plasma jet formed at the arc generator where temperatures of up to 10,000° F. are reached. The gas (CO) flow rate (1000 s.c.f.m.) and energy input to the arc generator are sufficient to insure the liquefaction of both the phosphatic material and the silica. The fine droplets of liquid and the coke particles are entrained in the carbon monoxide and sprayed into a fluidized bed of pelletized slag that is contained in the fluidization vessel immediately above the plasma arc generator. The slag is composed of all residual materials remaining in the fluidized bed after the vaporized free phosphorus and CO have been directed out of the fluidized bed into the phosphorus condensers. The temperature of the fluidized slag bed is such as to maintain the surface of the bed particles in a semimolten condition. The phosphate reduction reaction occurs on the surface of the bed particles wherever the molten phosphate and silica flux are in contact with solid carbon. The temperatures of the slag bed are in the range of 2000 to 2300° F. The phosphorus and carbon monoxide that are liberated by the reduction reaction leave the bed at the bed temperaure. These gases are cooled to about 700° F. prior to their entry into a water spray chamber where the phosphorus (one ton per hour) is separated from carbon monoxide by condensation in the usual manner. Slag pellets are removed from the fluidized bed continuously at the rate of 7.4 tons/hour.

A very real benefit is gained by operating the fluidized slag bed in the manner described. By keeping a thin liquid film on the surface of the bed particles, the fluidized bed acts as a filtering device that collects both the entrained coke particles along with the droplets of phosphatic material and silica. The gases leaving a fluidized bed which is operating in this "self-agglomerating" manner are virtually free of any entrained dust. Therefore, these gases contain none of the siliceous and phosphatic material that is so troublesome in the condensation and purification of phosphorus as in the electric furnace method. This process is easily adapted to automatic process control, primarily because no hot molten slag is to be tapped periodically.

By employing the subject process of this invention for coating purposes, it is possible to realize several advantages over conventional processing techniques. Some of the advantages are:
(1) Reduced energy requirements
(2) Use of lower-grade materials without operational difficulty
(3) Elimination of dust loss
(4) Improved continuity of operation
(5) Elimination of tapping, chilling, and crushing operations
(6) Reduction of plant area
(7) Improve quality control of product
(8) Lower operating labor cost
(9) Reduce capital costs (elimination of electrostatic precipitators).

Having thus provided a description of this invention along with specific examples thereof, it should be understood that no undue limitations or restrictions are to be imposed by reason thereof, but that the scope of the invention is defined by the appended claims.

What is claimed is:
1. A process for coating particles comprising the steps of
   (a) introducing a coating material into a plasma jet flame,
   (b) introducing the plasma jet flame containing the coating material into a bed of fluidized particles,
   (c) coating the particulate solids in the fluidized bed with said coating material, and
   (d) removing the coated particulate solids from the fluidized bed.

2. The process of claim 1 including the steps of maintaining control of electrical energy input, temperature of the fluidized bed, and the rate of flow of the coating substance.

3. The process of claim 1 wherein an auxiliary gas other than the plasma gas is introduced to promote fluidization of the particulate solids in the fluidized bed.

4. The process of claim 1 wherein the coating material constitutes a high melting point substance.

5. A process of coating one solid high melting point material on another solid higher melting point material comprising the steps of
   (a) introducing a plasma jet flame into a bed of fluidized particulate solids consisting of high melting point particulate materials of different melting point temperatures,
   (b) vaporizing the lower melting point fluidized particulate solids entrained in the plasma flame,
   (c) condensing the vapor material of the lower melting point material on the surface of the less volatile higher melting point fluidized particulate solids, and
   (d) removing the coated particulate solids from the fluidized bed.

6. A process of coating one solid high melting point material on another solid higher melting point material comprising the steps of
   (a) introducing a plasma jet flame into a bed of fluidized particulate solids consisting of two high melting point particulate materials of different melting point temperatures, (b) making molten the lower melting point fluidized particulate solids entrained in the plasma flame,
(c) solidifying the molten material of the lower melting point material on the surface of the less volatile higher melting point fluidized particulate solids, and
(d) removing the coated particulate solids from the fluidized bed.

7. A process for effecting a chemical reaction with high melting point materials at very high temperatures on the surface of fluidized particulate solids comprising the steps of
(a) introducing said high melting point materials into a plasma jet flame,
(b) converting said high melting point materials into a vapor state while in the plasma gas,
(c) introducing the plasma jet flame containing said high melting point materials in a vapor state into a bed of fluidized particulate solids,
(d) reacting the entrained high melting point materials in a vapor state with the particulate solids of the fluidized bed, and
(e) removing the fluidized particulate solids which have reacted with said entrained high melting point materials in a vapor state.

8. A process for effecting a chemical reaction with high melting point materials at very high temperatures on the surface of the fluidized particulate solids comprising the steps of
(a) introducing said high melting point materials into a plasma jet flame,
(b) converting said high melting point materials into a molten state while entrained in the plasma gas,
(c) introducing the plasma jet flame containing said high melting point materials in a molten state into a bed of fluidized particulate solids,
(d) reacting the entrained high melting point materials in a molten state with the particulate solids of the fluidized bed, and
(e) removing the fluidized particulate solids which have reacted with said entrained high melting point materials in a molten state.

9. A process for converting high melting point particles into fused masses comprising the steps of
(a) introducing a plasma flame jet into a bed of fluidized particulate solids,
(b) heating the fluidized particulate solids until they become fused masses, and
(c) removing the particulate fused masses from the fluidized bed.

10. A process for effecting a very rapid transfer of heat and energy from a plasma jet flame comprising the steps of
(a) introducing a plasma jet flame into a bed of fluidized particulate solids,
(b) entraining the fluidized particulate solids in the flame of the plasma jet,
(c) heating the said entrained particulate solids in the plasma jet flame, and
(d) removing the heated fluidized particulate solids.

11. A process for controlling chemical reaction between the components of a plasma jet flame comprising the steps of
(a) introducing a plasma jet flame into a bed of fluidized particulate solids, and
(b) maintaining a rate of removal of heat from particulate solids from the fluidized bed such as to control the rate of reaction of the components of the plasma jet flame and the extent of reaction of the components of the plasma jet flame.

12. A process for effecting a chemical reaction between an auxiliary fluidizing gas and a plasma gas comprising the steps of
(a) introducing an auxiliary fluidizing gas into a fluidized bed,
(b) introducing a plasma jet flame into the said fluidized bed,
(c) heating the auxiliary fluidizing gas entrained in the plasma jet flame to a thermal level wherein the said auxiliary fluidizing gas dissociates and reacts to form new gaseous substances, and
(d) removing the said new gaseous substances from the fluidized bed.

13. A process for effecting a chemical reaction between an auxiliary fluidizing gas, a plasma gas, and fluidized particulate solids comprising the steps of
(a) introducing reactive particulate solids into a fluidized bed,
(b) introducing an auxiliary fluidizing gas into the fluidizing bed and thereby fluidizing the said reactant particulate solids,
(c) introducing a plasma gas into the fluidized bed of said reactive particulate solids,
(d) heating the auxiliary fluidizing gas entrained in the plasma jet flame to a thermal level wherein the said auxiliary fluidizing gas dissociates and reacts to form new gaseous substances,
(e) reacting said new gaseous substances entrained in the plasma jet flame with the said high melting point fluidized particulate solids entrained in the plasma jet flame to form new particulate solids, and
(f) removing said new particulate solids from the fluidized bed.

14. A process of manufacturing calcium carbide comprising the steps of
(a) charging very fine powders of carbon and lime into a plasma jet stream,
(b) liquifying the lime into molten droplets in the plasma jet stream,
(c) introducing the plasma jet stream with the entrained carbon particles and molten lime droplets into a fluidized bed containing calcium carbide particulate solids,
(d) reacting the molten lime droplets with the carbon particles on the surface of the said fluidized calcium carbide particulate solids to form larger size calcium carbide particles, and
(e) removing the said particles of calcium carbide from the fluidized bed.

15. A process of extracting elemental phosphorus comprising the steps of:
(a) introducing finely divided powders of phosphatic material, silica flux, and carbon into a plasma jet stream;
(b) liquifying into molten droplets the said phosphatic material and silica flux entrained in the plasma jet flame;
(c) introducing the plasma flame with the said entrained molten droplets of phosphatic materials and silica flux and particles of carbon into a bed of solids of phosphate rock slag;
(d) reducing the phosphatic material on the surface of the fluidized bed particles where phosphatic material, flux, and carbon particles come in mutual contact;
(e) evaporating the free elemental phosphorus, and
(f) collecting and condensing the phosphorus vapors as they exit from the fluidized bed.

16. The process of claim 15 wherein the plasma gas is carbon monoxide (CO).

References Cited by the Examiner

UNITED STATES PATENTS

| | | | |
|---|---|---|---|
| 1,902,351 | 3/1932 | Baumann et al. | 204—323 X |
| 2,414,625 | 1/1947 | Abrams et al. | 117—100 X |
| 2,785,119 | 7/1955 | Cook et al. | 204—171 X |
| 2,799,640 | 7/1957 | Pevere et al. | 204—171 |
| 2,922,869 | 1/1960 | Giannini et al. | |
| 2,967,091 | 1/1961 | Robertson | 23—223 |
| 2,968,683 | 1/1961 | Kossmann | 34—10 X |
| 3,006,838 | 10/1961 | Johnson | 204—312 |

(Other references on following page)

UNITED STATES PATENTS

| | | | |
|---|---|---|---|
| 3,010,796 | 11/1961 | Alexander | 23—223 |
| 3,022,137 | 2/1962 | Nelson | 106—300 X |
| 3,051,632 | 8/1962 | Anderson | 204—178 |
| 3,056,659 | 10/1962 | Yarze et al. | 23—223 |
| 3,071,678 | 1/1963 | Neely et al. | 219—76 |
| 3,089,785 | 5/1963 | Lewis et al. | 117—100 |
| 3,091,920 | 6/1963 | Matray | 204—323 X |
| 3,119,758 | 1/1964 | Orbach | 204—171 |
| 3,182,176 | 5/1965 | Bunt et al. | 219—75 X |

FOREIGN PATENTS 863,190    3/1961    Great Britain.

OTHER REFERENCES

Welding Journal, September 1959, pp. 870 to 875.
Research/Development, January 1960, pp. 5 to 9, 11, 12 and 15.

WILLIAM D. MARTIN, *Primary Examiner.*

RICHARD D. NEVIUS, *Examiner.*